(12) United States Patent
Steele

(10) Patent No.: US 9,826,859 B1
(45) Date of Patent: Nov. 28, 2017

(54) PORTABLE COLLAPSIBLE GRILL

(71) Applicant: Elwyn Steele, Valley Stream, NY (US)

(72) Inventor: Elwyn Steele, Valley Stream, NY (US)

(*) Notice: Subject to any disclaimer, the term of this patent is extended or adjusted under 35 U.S.C. 154(b) by 732 days.

(21) Appl. No.: 14/260,682

(22) Filed: Apr. 24, 2014

(51) Int. Cl.
*A47J 37/07* (2006.01)

(52) U.S. Cl.
CPC ....... *A47J 37/0704* (2013.01); *A47J 37/0763* (2013.01)

(58) Field of Classification Search
CPC .................................................. A47J 37/0763
See application file for complete search history.

(56) References Cited

U.S. PATENT DOCUMENTS

| | | | | |
|---|---|---|---|---|
| 4,840,118 | A * | 6/1989 | Rinehart | A47J 37/0704 126/25 R |
| 5,016,607 | A * | 5/1991 | Doolittle | A47J 37/0786 126/25 R |
| 6,050,177 | A * | 4/2000 | Lassig, Jr. | F24C 1/02 126/25 R |
| 6,631,711 | B2 | 10/2003 | Patience | |
| 6,951,213 | B2 | 10/2005 | Coleman et al. | |
| 6,981,497 | B2 * | 1/2006 | DeMars | A47J 37/0704 126/25 R |
| 7,438,071 | B2 | 10/2008 | Johnson et al. | |
| 2002/0078944 | A1 * | 6/2002 | Cozzolino | A47J 37/0704 126/41 R |
| 2005/0121020 | A1 * | 6/2005 | McLemore | A47J 37/0704 126/25 R |
| 2005/0211237 | A1 * | 9/2005 | Woller | A47J 37/0763 126/25 R |
| 2013/0312732 | A1 * | 11/2013 | Brennan | A47J 37/07 126/25 R |

* cited by examiner

*Primary Examiner* — Kenneth Rinehart
*Assistant Examiner* — Logan Jones
(74) *Attorney, Agent, or Firm* — Stevenson IP, LLC

(57) ABSTRACT

A portable collapsible grill including a grill body having a firebox and a hood pivotally attached to the firebox to cover a top side thereof. A cooking assembly disposed within the firebox is configured to permit gas grilling. Vents and an access door are disposed on a firebox rear side. A retractable leg assembly, disposed on a firebox bottom side, includes a housing having an upper wall attached to the bottom side and a lower wall, a leg disposed on the lower wall proximal each one of a corner of the housing, and a lockable caster wheel disposed on each leg. A single side shelf is pivotally disposed on each of a right and left side of the firebox proximal the top side. A cooking tool hanger body is disposed on one of the right and left sides in a position below the respective side shelf.

2 Claims, 3 Drawing Sheets

PORTABLE COLLAPSIBLE GRILL

BACKGROUND OF THE INVENTION

Various types of cooking grills are known in the prior art. However, what is needed is a portable collapsible grill including a grill body having a firebox and a hood pivotally attached to the firebox to cover a top side thereof; a cooking assembly disposed within the firebox that is configured to permit gas grilling. A retractable leg assembly, disposed on a firebox bottom side, includes a housing having an upper wall attached to the bottom side and a lower wall, a leg disposed on the lower wall proximal each one of a corner of the housing, and a lockable caster wheel disposed on each leg. A single side shelf is pivotally disposed on each of a right and left side of the firebox proximal the top side. A cooking tool hanger body is disposed on one of the right and left sides in a position below the respective side shelf. The retractability of the leg assembly and the pivotal disposition of the side shelves facilitate the collapsibility of the present device to accommodate portability.

FIELD OF THE INVENTION

The present invention relates to cooking grills, and more particularly, to a portable collapsible grill.

SUMMARY OF THE INVENTION

The general purpose of the present portable collapsible grill, described subsequently in greater detail, is to provide a portable collapsible grill which has many novel features that result in a portable collapsible grill which is not anticipated, rendered obvious, suggested, or even implied by prior art, either alone or in combination thereof.

To accomplish this, the present portable collapsible grill includes a grill body which, in turn, includes a firebox and a hood pivotally attached thereto to cover the top side of the firebox. Each of a front side and the rear side of the firebox has a width proximal the top side of the firebox greater than a width proximal the bottom side firebox. The firebox top side has a width greater than a width of the bottom side. In addition, the bottom side is centrally disposed along a vertical midline axis of the firebox. A cooking assembly is disposed within the firebox. The cooking assembly includes a plurality of controls disposed on a firebox front side that are in operational communication with a gas source, a grate cooking surface removably positioned within the firebox, and at least one burner within the firebox in operational communication with a valve regulator of the controls. Vents disposed on the rear side of the firebox are configured to prevent precipitation, dust, and debris from entering the firebox while allowing air circulation. An access door is also disposed on the rear side of firebox proximal the bottom side of the firebox to permit maintenance.

A retractable leg assembly is disposed on the bottom side of the firebox. The leg assembly includes a hollow parallelepiped housing having an upper wall attached to the firebox bottom side, a lower wall and a plurality of legs disposed on the lower wall proximal one of a corner of the housing. A lockable caster wheel is disposed on each leg. A single side shelf is pivotally disposed on each of the right and left sides of the firebox in a position proximal the top side. Each side shelf member pivots from a first position substantially perpendicular to the top side of the firebox and below the respective arms to a second position generally coplanar with the arms and parallel to the top side of the firebox. The shape of the firebox and the convex shape of the side shelf bottom surface allow the side shelves to be folded adjacent the firebox.

A cooking tool hanger body is disposed on one of the right side and the left side of the firebox in a position below the respective arms and proximal the bottom side. The cooking tool hanger body includes at least one hook for hanging grilling implements. In addition, a handle is disposed on each of the right and left sides of the firebox and on a forward side of the hood.

The retractability of the leg assembly and the pivotal disposition of the side shelves facilitate the collapsibility of the present device to accommodate portability. Thus has been broadly outlined the more important features of the present portable collapsible grill so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
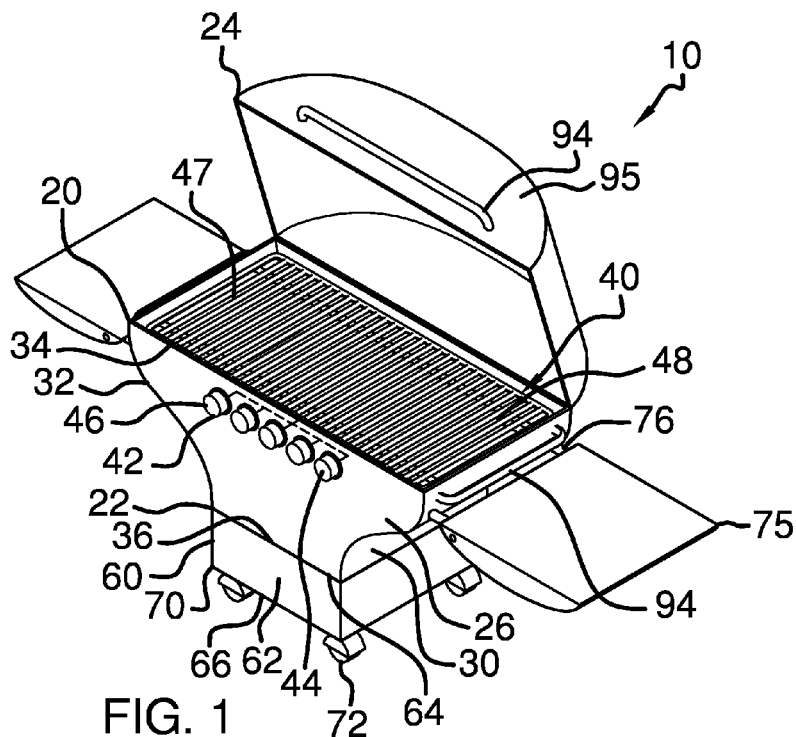
FIG. 1 is an isometric view.
Figure 2:
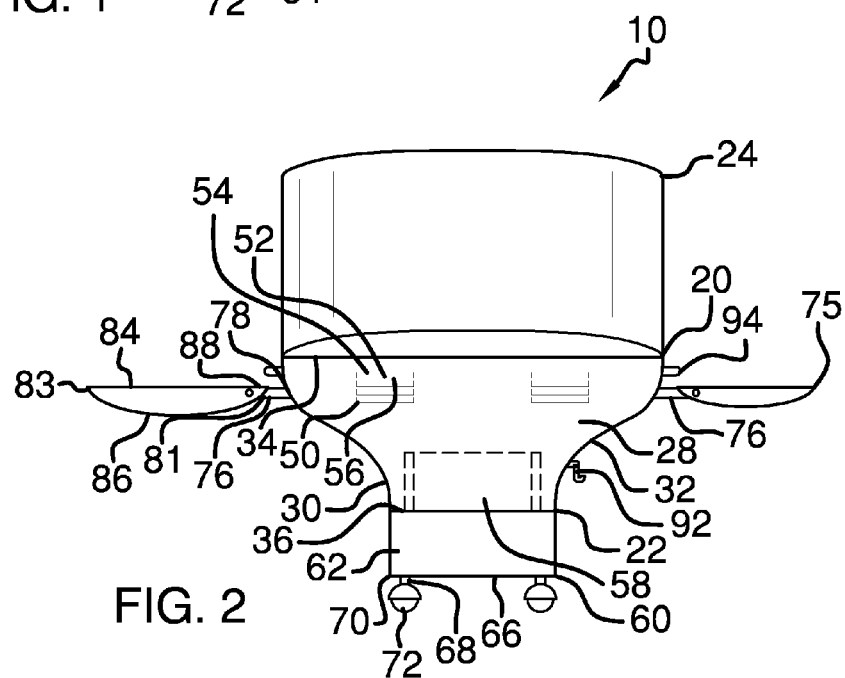
FIG. 2 is a rear elevation view.
Figure 3:
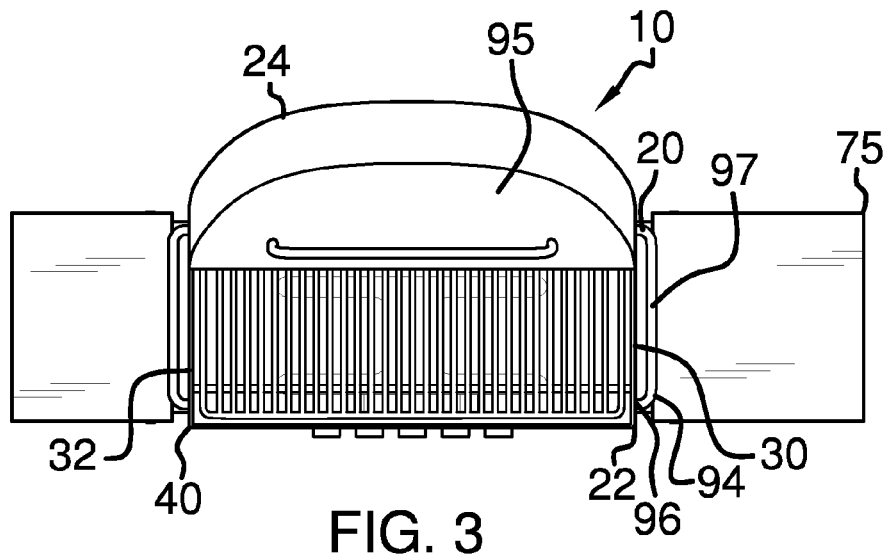
FIG. 3 is a top plan view.
Figure 4:
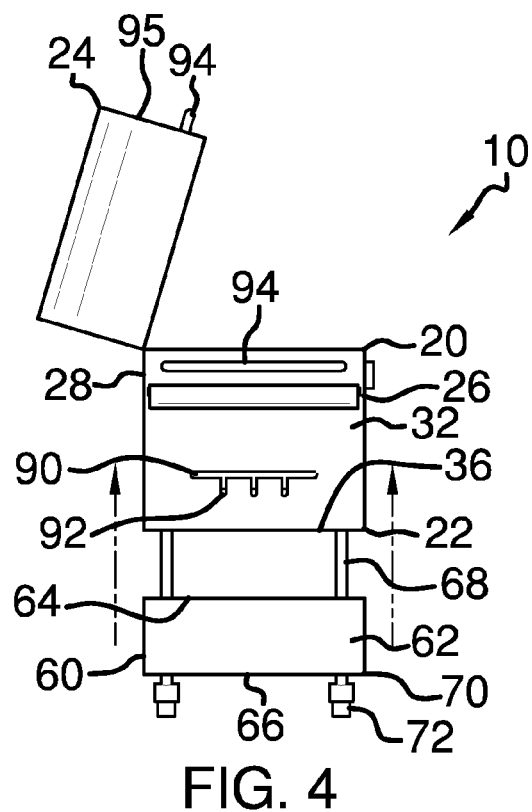
FIG. 4 is a side elevation view.
Figure 5:
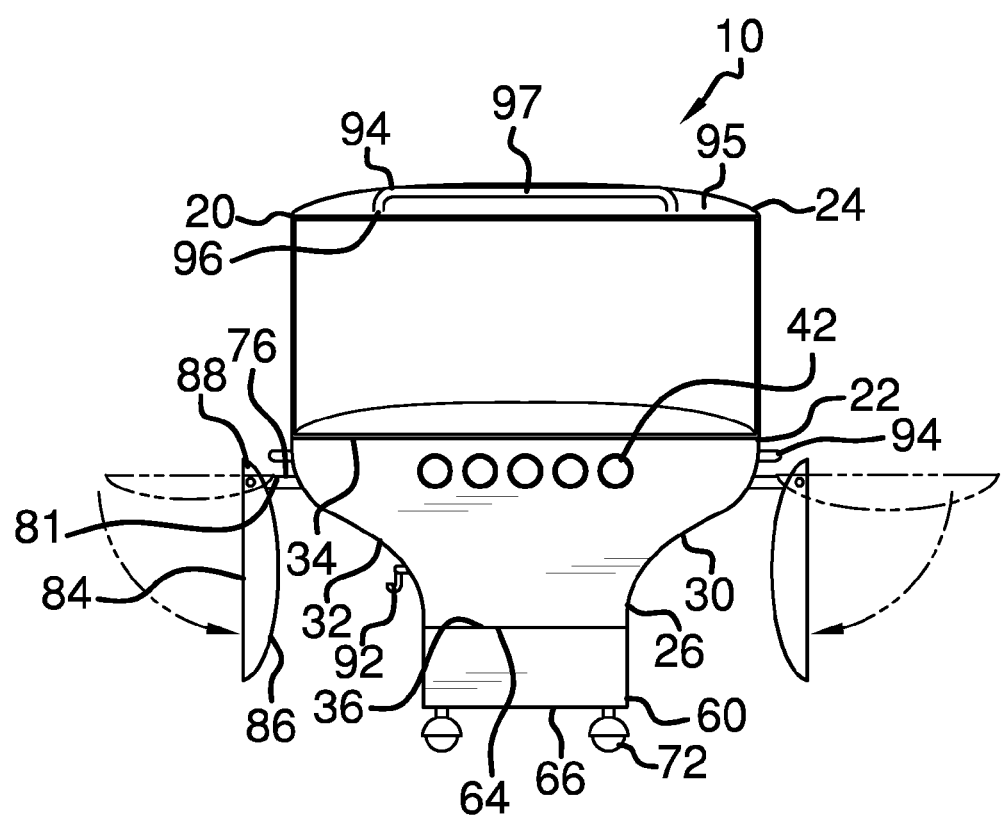
FIG. 5 is a front elevation view.

With reference now to the drawings, and in particular FIGS. 1 through 5 thereof, an example of the instant portable collapsible grill employing the principles and concepts of the present portable collapsible grill and generally designated by the reference number 10 will be described.

Referring to FIGS. 1 through 5 the present portable collapsible grill 10 is illustrated. The portable collapsible grill 10 includes a grill body 20. The grill body 20 includes a firebox 22 and a hollow Quonset®-shaped hood 24 pivotally attached to the firebox 22. The firebox 22 has a front side 26, a rear side 28, a right side 30, a left side 32, a top side 34, and a bottom side 36. The hood 24 is configured to cover the top side 34 of the firebox 22. Each of the front side 26 and the rear side 28 has a width proximal the top side 34 greater than a width proximal the bottom side 36. The firebox 22 top side 34 has a width greater than a width of the bottom side 36. In addition, the bottom side 36 is centrally disposed along a vertical midline axis of the firebox 22.

A cooking assembly 40 is disposed within the firebox 22. The cooking assembly 40 includes a plurality of controls 42 disposed on the front side 26 of the firebox 22. The controls 42 include a plurality of valve regulators 44 and a starter 46. The starter 46 and the valve regulators 44 are in operational communication with an existing gas source. A grate cooking surface 47 is removably positioned within the firebox 22. At least one burner 48 is disposed within the firebox 22 in a position below the grate cooking surface 47. Each burner 48 is in operational communication with a valve regulator 44. The controls 42 are in operational communication with the gas source. A plurality of vents 50 is disposed on the rear side 28 of the firebox 22 to permit air circulation within the firebox 22. Each vent 50 has a cover portion 52 having a top end 54 integrally disposed on the rear side 28 and a bottom overhang 56 to prevent precipitation, dust, and debris from entering the firebox 22 thereby assisting in keeping the firebox clean, dry, and ready for use. An access door 58 is also disposed on the rear side 28 of firebox 22 proximal the bottom side 36 of the firebox 22 to permit access to the firebox 22 for maintenance.

A retractable leg assembly 60 is disposed on the bottom side 36 of the firebox 22. The leg assembly 60 includes a hollow parallelepiped housing 62 having an upper wall 64 attached to the firebox 22 bottom side 36 and a lower wall 66. A plurality of legs 68 is provided. Each leg 68 is disposed on the lower wall 66 proximal one of a corner 70 of the housing 62. A lockable caster wheel 72 is disposed on each leg 68 to promote portability of the device 10, while alternately allowing the device 10 to be locked into a static position while using the device 10 for grilling food items. The leg assembly 60 housing 62 has a width and a length equal to a width and a length of the bottom side 36 of the firebox 22.

A single side shelf 75 is disposed on each of the right and left sides 30, 32 of the firebox 22 in a position proximal the top side 34. Each side shelf 75 includes a pair of arms 76 disposed parallel to the top side 34 of the firebox 22 in a position between the top side 34 and the bottom side 36. Each arm 76 has an interior side 78 attached to the firebox 22 and an exterior side 81, a member 83 having planar top surface 84, a convex bottom surface 86, and an internal corner 88. The internal corner 88 is pivotally attached to the exterior side 81 of the respective arm 76. Each side shelf 75 member 83 pivots from a first position in which the side shelf 75 is substantially perpendicular to the top side 34 of the firebox 22 and below the respective arms 76 to a second position in which the side shelf 75 is generally coplanar with the arms 76 and parallel to the top side 34 of the firebox 22. The retractability of the leg assembly 60 and the pivotal disposition of the side shelves 75 facilitate the collapsibility of the present device 10 to accommodate portability.

A cooking tool hanger body 90 is disposed on one of the right side 30 and the left side 32 of the firebox 22 in a position below the respective arms 76 and proximal the bottom side 36. The cooking tool hanger body 90 includes at least one hook 92 which allows grilling implements, such as a set of grill tongs, a basting brush, a fork, a spatula, and a cleaning brush, to be conveniently stored on the device 10 for ease of access. The position of the tool hanger body 90 permits the side shelves 75 to be folded down without infringement by the tool hanger body 90.

A handle 94 is disposed on each of the right and left sides 30, 32 of the firebox 22 and on a forward side 95 of the hood 24. Each handle 94 has a pair of outer ends 96 opposite each other and a center portion 97 disposed between the outer ends 96 in a position perpendicular thereto. Each outer end 96 is disposed on the respective right and left side 30, 32. The center portion 97 is spaced apart from the respective right and left side 30, 32 and from the forward side 95 of the hood 24 to permit a user to grasp the respective handle 94 to move the device 10 and to lift the hood 24, respectively.

What is claimed is:

1. A portable collapsible grill comprising:
   a grill body having a firebox and a hollow semicylindrical hood pivotally attached to the firebox, the firebox having a front side, a rear side, a right side, a left side, a top side, and a bottom side, the hood being configured to cover the top side of the firebox, wherein each of the front side and the rear side has a width proximal the top side greater than a width proximal the bottom side;
   a cooking assembly disposed within the firebox, the cooking assembly comprising:
      a plurality of controls disposed on the front side of the firebox, the controls comprising a plurality of valve regulators and a starter, wherein the starter and the valve regulators are in operational communication with a gas source;
      a grate cooking surface removably positioned within the firebox;
      at least one burner disposed within the firebox in a position below the grate cooking surface; wherein each burner is in operational communication with a valve regulator;
      wherein the controls are in operational communication with the gas source;
   a plurality of vents disposed on the rear side of the firebox, wherein each vent has a cover portion having a top end integrally disposed on the rear side and a bottom overhang;
   a retractable leg assembly disposed on the bottom side of the firebox, wherein the leg assembly comprises a hollow parallelepiped housing having an upper wall attached to the firebox bottom side and a lower wall, a plurality of legs, each leg disposed on the lower wall proximal one of a corner of the housing, and a lockable caster wheel disposed on each leg, wherein the leg assembly housing has a width and a length equal to a width and a length of the bottom side of the firebox;
   a single side shelf disposed on each of the right and left sides of the firebox in a position proximal the top side, each side shelf comprising:
      a pair of arms disposed parallel to the top side of the firebox in a position between the top side and the bottom side, each arm having an interior side attached to the firebox and an exterior side;
      a member having planar top surface, a convex bottom surface, and an internal corner, the internal corner pivotally attached to the exterior side of the respective arm;
      wherein each side shelf member pivots from a first position substantially perpendicular to the top side of the firebox and below the respective arms to a second position generally coplanar with the arms and parallel to the top side of the firebox;
   an access door disposed on the rear side of firebox proximal the bottom side of the firebox;
   a cooking tool hanger body disposed on one of the right side and the left side of the firebox in a position below the respective arms, the cooking tool hanger body comprising at least one hook; and
   a handle disposed on each of the right and left sides of the firebox and on a forward side of the hood;
   wherein the firebox top side has a width greater than a width of the bottom side; and
   wherein the bottom side is centrally disposed along a vertical midline axis of the firebox.

2. The portable collapsible grill of claim 1 wherein each handle has a pair of outer ends opposite each other and a center portion disposed between the outer ends in a position perpendicular thereto, wherein each outer end is disposed on the respective right and left side and wherein the center portion is spaced apart from the respective right and left side and the forward side of the hood.

* * * * *